United States Patent [19]

Morishita et al.

[11] Patent Number: 4,712,451

[45] Date of Patent: Dec. 15, 1987

[54] STARTER WITH A GEAR REDUCTION MECHANISM

[75] Inventors: Akira Morishita; Kyoichi Okamoto; Taiichi Nakagawa; Hiroyuki Morikane; Akinori Hasegawa; Takemi Arima; Tadami Kounou, all of Himeji, Japan

[73] Assignee: Mitsubishi Denki Kabushiki Kaisha, Tokyo, Japan

[21] Appl. No.: 818,633

[22] Filed: Jan. 14, 1986

[30] Foreign Application Priority Data

Jan. 18, 1985 [JP] Japan .............................. 60-5799[U]

[51] Int. Cl.$^4$ ......................... F02N 15/06; F16H 1/32

[52] U.S. Cl. ....................................... 74/801; 74/7 E; 74/446; 74/460; 74/DIG. 10; 290/48; 310/83

[58] Field of Search ................. 74/421 A, 421 R, 7 E, 74/446, 460, 801, DIG. 10; 290/38 C, 48; 310/43, 83

[56] References Cited

U.S. PATENT DOCUMENTS

| | | | |
|---|---|---|---|
| 2,932,992 | 4/1960 | Larsh | 74/801 X |
| 3,076,352 | 2/1963 | Larsh | 74/460 X |
| 3,169,408 | 2/1965 | Rouverol | 74/421 R |
| 4,463,831 | 8/1984 | Wakase | 74/DIG. 10 X |
| 4,553,442 | 11/1985 | Mazzorana | 290/48 X |

FOREIGN PATENT DOCUMENTS

| | | | |
|---|---|---|---|
| 55-20931 | 2/1980 | Japan | 74/DIG. 10 |

*Primary Examiner*—Allan D. Herrmann

*Attorney, Agent, or Firm*—Sughrue, Mion, Zinn, Macpeak, and Seas

[57] ABSTRACT

A starter with a gear reduction mechanism including an internal ring gear formed of synthetic resin and a reinforcing member. The internal ring gear has a cylindrical portion and a toothed portion formed on an inner peripheral surface of the cylindrical portion. The reinforcing member is secured around an outer surface of the cylindrical portion.

10 Claims, 3 Drawing Figures

STARTER WITH A GEAR REDUCTION MECHANISM

BACKGROUND OF THE INVENTION

This invention relates to a starter with a gear reduction mechanism, and more particularly to the structure of an internal gear which is incorporated in a gear reduction mechanism.

FIG. 1 shows a conventional starter with a gear reduction mechanism, such as that shown in Japanese Utility Model Publication No. 58-134056. The numeral 1 indicates a starter with a gear reduction mechanism, and 2 indicates a D.C. motor which is secured to a front bracket 3 with bolts (not shown).

A yoke 4 of the D.C. motor 2 is fixed to a faucet joint portion 3*a* of the front bracket 3. An intermediate bracket 5 (described hereinafter) made of resin, an isolating plate 6 and a base board 8 for a brush device 7 are integrally secured to the portion 3*a* of the front bracket 3. The intermediate bracket 5, made of molded synthetic resin which is mainly nylon, consists of a boss portion 5*a*, a flange 5*b*, and a cylindrical portion 9*a*. The flange portion is fitted into the faucet joint portion.

A plurality of teeth are formed on an inner peripheral surface of the cylindrical portion 9*a* to form an internal ring gear 9. A sleeve bearing 10 is fitted on an inner peripheral surface of the boss portion 5*a*. An output shaft 11 having a groove 11*a* formed at one end thereof is rotatably supported on the sleeve bearing. On an outer peripheral surface of the output shaft 11 is formed a helical spline 11*b* which engages an overrunning clutch (not shown). At the rear end portion of the output shaft 11 a flange 12 is fixed, in which supporting pins 13 are planted. The supporting pins 13 support planetary gears 14 through a sleeve bearing 15. The planetary gears 14 mesh with the internal ring gear 9 and with a spur gear 18, which is provided at the front end portion of a rotary shaft 17 of an armature 16.

The planetary gear reduction mechanism operates through the gear train constructed as described above. A sleeve bearing 19 for rotatably supporting the front end of the rotary shaft 17 of the armature 16 is provided on an inner peripheral surface of the groove 11*a* of the output shaft 11. A steel ball 20 is inserted into the space between the front end of the rotary shaft 17 and the output shaft 11, in order to absorb the load applied to the rotary shaft 17 and the output shaft 11. A commutator 21 is fitted on the rotary shaft 17, and has one end electrically connected to an armature coil 22 which is wound around an armature core 23. Brushes 24 supported by brush holders 25 are in slidable contact with the commutator 21 under a force provided by a spring 26. Poles 27 made of permanent magnetic materials such as ferrite are mounted on an inner peripheral surface of the yoke 4, to which a grommet 28 is attached.

The operation of the conventional starter thus constructed now will be described. The brushes 24 are electrically connected to an external power source (not shown), and the armature current is supplied to the armature coil 22 through the brushes 24 and the commutator 21. Thus the armature 16 is rotated through magnetic fields generated by the poles 27. The rotating force of the armature 16 is transmitted to the output shaft 11, with the speed of the rotary shaft 17 being reduced by the planetary gears 14.

Consequently, an internal combustion engine (not shown) is rotated by the overrunning clutch (not shown) which turns with the output shaft 11 by means of a spline (not shown) which connects the output shaft with the clutch. The internal ring gear 9 undergoes stress caused by the meshing of the internal ring gear 9 with the planetary gears 14. Consequently, it is necessary to reinforce the cylindrical portion 9*a* of the internal ring gear 9 in order for the gear to have the same strength as a gear formed of metal, since the internal ring gear 9 is formed of resin.

To meet the strength requirement, the cylindrical portion 9*a* has had to be made relatively thick, so that the size and cost of the internal ring gear 9 have been substantial.

Furthermore, the toothed portion of the internal ring gear 9 are deformed by a sink phenomenon which occurs during the molding process. In addition, the internal ring gear 9 is deformed and is sometimes destroyed, since the pressure is concentrically applied to the toothed portion of the internal ring gear 9 which is meshed with the planetary gears 14. For example, when three planetary gears are arranged at equal angular intervals, the internal ring gear 9 is deformed into a triangular shape.

SUMMARY OF THE INVENTION

An object of this invention is to provide a new and improved internal gear for a starter with a gear reduction mechanism.

Another object of this invention is to increase the mechanical strength of the internal ring gear in order to prevent the internal ring gear from being deformed during operation.

Still another object of this invention is to provide a compact, inexpensive internal ring gear.

These objects are accomplished by a starter with a gear reduction mechanism which comprises an internal ring gear formed of synthetic resin and a reinforcing member.

The internal ring gear has a cylindrical portion and a toothed portion which is formed on an inner peripheral surface of the cylindrical portion. The reinforcing member is made of a material having higher mechanical strength than the synthetic resin, and is secured to an outer surface of the cylindrical portion.

Metals, piano wires, strengthened resins and light alloys may be used in the reinforcing member.

DESCRIPTION OF THE PREFERRED EMBODIMENT

Figure 1:
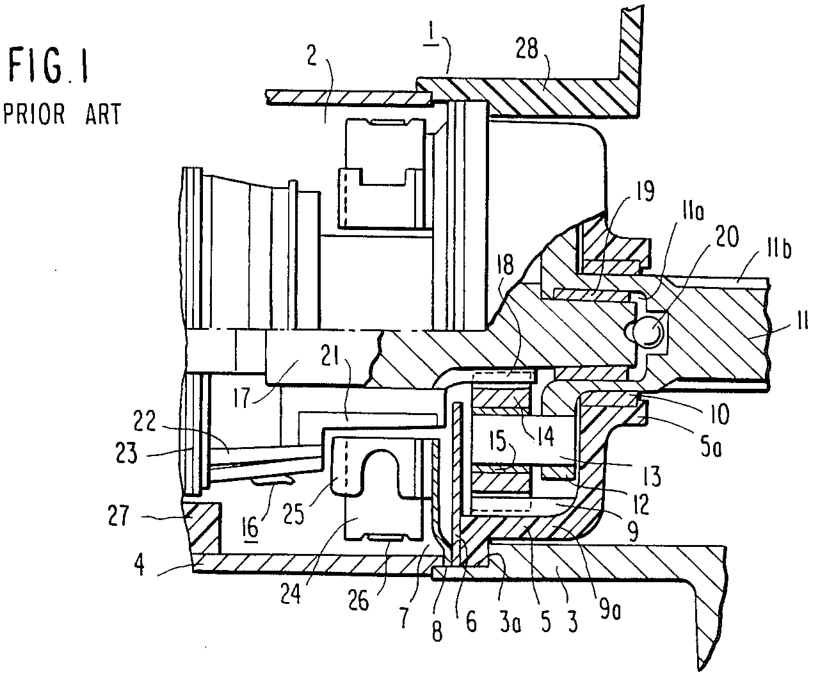
FIG. 1 PRIOR ART
FIG. 1 is a sectional view showing an essential part of a conventional starter with a gear reduction mechanism.
Figure 2:
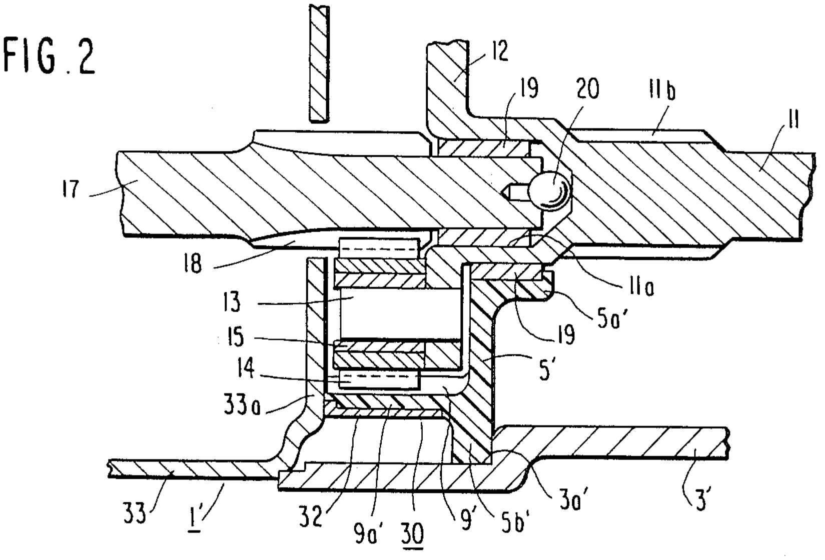
FIG. 2 is a sectional view showing an embodiment of the invention.
Figure 3:
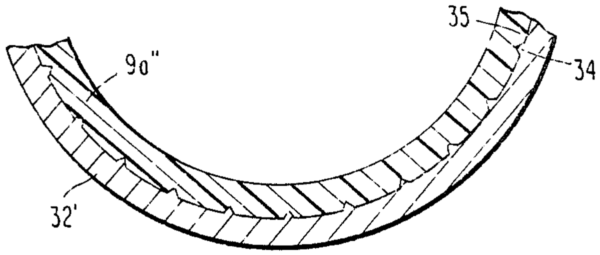
FIG. 3 is a cross-section showing a detail of an alternative embodiment of the invention.

The description of parts in FIG. 2 which are the same as those in FIG. 1 will be omitted from this description. In FIG. 2, the numeral 1′ indicates an internal reduction type starter which has a planetary gear reduction mechanism 30. An internal ring gear 9′ which is formed by molding with synthetic resin has a boss portion 5*a*′, an intermediate bracket 5′, a cylindrical portion 9*a*′ and a flange portion 5*b*′ which is firmly fitted into a faucet joint portion 3*a* of a front bracket 3′.

The outer peripheral surface of the cylindrical portion 9a' and the end surface of the internal ring gear 9' are fittedly covered with a reinforcing member 32 which is an iron sheet ring formed of deep-drawn steel sheet to reinforce the internal ring gear 9. Numeral 33 is a yoke of a D.C. motor and on its bottom portion 33a the front bracket 3 is fitted and the gear reduction mechanism 30 is mounted. The operational description of the structure thus constructed is omitted since it is the same as that already described.

With the above construction, it is simple to reinforce the cylindrical portion 9a' on which the toothed portion of the internal ring gear 9' is formed. Consequently, the cylindrical portion 9a' may be formed of resin materials without having to increase the overall thickness of the gear. Also, small deformations arising during molding are acceptable.

Thus, an inexpensive gear reduction mechanism having high mechanical strength can be obtained. Although the internal ring gear 9' is shown to be reinforced by the sheet ring 32 as described above, the outer peripheral surface of the cylindrical portion 9a' of the internal gear 9' may be wrapped with turns of binding wire (or piano wire), or may be covered with a ring made of strengthened synthetic resin such as carbon fiber or glass fiber. Also, the ring gear may be reinforced by a die casting ring made of a light alloy.

Furthermore, the iron sheet ring 32 may be formed integrally with the internal ring gear 9'. In this case, when radiated ribs 34 are provided on the ring 32, and corresponding indentations are 35 provided on the cylindrical portion 9a" of the internal ring gear 9, molding is made easier and the heat radiation effect is increased.

As described above, according to this invention, a starter has a gear reduction mechanism which has high accuracy, low weight and high mechanical strength. The mechanism includes an internal ring gear, made of synthetic resin, whose outer surface is reinforced by a member made of materials having higher mechanical strength than the synthetic resin. The mechanism can be produced relatively inexpensively, and will generate less noise than those made of metal because the mechanism is made of synthetic resin.

What is claimed is:

1. A gear reduction mechanism comprising:

a rotary shaft having a spur gear formed on an outer peripheral surface thereof;

a plurality of planet gears engaging said spur gear;

an output rotary shaft supporting said plurality of planet gears so as to cause rotation of said rotary shaft;

an internal ring gear formed of molded synthetic resin and having an intermediate bracket having a flange portion extending outwardly in the radial direction from said output rotary shaft, a cylindrical portion extending in the longitudinal direction with respect to said output rotary shaft, said flange portion acting as a cantilever for said cylindrical portion, and a toothed portion formed on an inner peripheral surface of said cylindrical portion, said plurality of planet gears engaging said toothed portion of said internal ring gear;

a front bracket into which said flange portion of said intermediate bracket is fitted so as to support said internal ring gear; and a reinforcing member comprising a material having a higher mechanical strength than said synthetic resin, said member being secured to the outer surface of said cylindrical portion.

2. A gear reduction mechanism according to claim 1, wherein said material comprises a pure metal.

3. A gear reduction mechanism according to claim 1, wherein said material comprises strengthened synthetic resin.

4. A gear reduction mechanism according to claim 1, wherein said material comprises a light alloy.

5. A gear reduction mechanism according to claim 1, wherein said reinforcing member is a ring.

6. A gear reduction mechanism according to claim 1, wherein said reinforcing member is secured to the outer peripheral surface and the end surface of the cylindrical portion.

7. A gear reduction mechanism according to claim 2, wherein said pure metal is iron.

8. A gear reduction mechanism according to claim 3, wherein said strengthened synthetic resin is carbon fiber.

9. A gear reduction mechanism according to claim 3, wherein said strengthened synthetic resin is glass fiber.

10. A gear reduction mechanism according to claim 1, wherein said reinforcing member includes a plurality of projections extending radially inwardly from an inner peripheral surface thereof.

* * * * *